United States Patent
Hyen

(10) Patent No.: US 7,209,417 B2
(45) Date of Patent: Apr. 24, 2007

(54) METHOD OF AND APPARATUS FOR RECORDING DATA ON DEFECTIVE OPTICAL STORAGE MEDIA AND COMPUTER READABLE MEDIUM STORING THE METHOD

(75) Inventor: Sang-hoon Hyen, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 573 days.

(21) Appl. No.: 10/720,754

(22) Filed: Nov. 25, 2003

(65) Prior Publication Data

US 2004/0179442 A1    Sep. 16, 2004

(30) Foreign Application Priority Data

Nov. 26, 2002    (KR)    .................. 10-2002-0074129

(51) Int. Cl.
G11B 7/00    (2006.01)
(52) U.S. Cl. .................................. 369/47.1
(58) Field of Classification Search ............ None
See application file for complete search history.

(56) References Cited

U.S. PATENT DOCUMENTS 6,614,740 B1 *  9/2003  Park et al. .............. 369/59.17
6,678,226 B2 *  1/2004  Horibata et al. ........... 369/47.3

FOREIGN PATENT DOCUMENTS

JP    05-114252    5/1993
KR    1999-12101   2/1999

* cited by examiner

Primary Examiner—William Korzuch
Assistant Examiner—Parul Gupta
(74) Attorney, Agent, or Firm—Staas & Halsey LLP

(57) ABSTRACT

A method of recording data in a defective area of an optical storage medium. The method includes the steps of detecting a write start address in response to a write command; checking, when the write start address is not detected due to unstable servo control signals during the detection of the write start address, whether a specific area at the write start address is a defective area; continuing to detect the write start address while disabling a register which checks whether the servo control signals are stable when the specific area is determined to be the defective area; recording previously-generated data in the specific area when the write start address is detected and enabling the register which checks whether the servo control signals are stable; determining a replacement address for the write start address while the register which checks whether the servo control signals are stable is enabled; and recording data at the replacement address.

15 Claims, 2 Drawing Sheets

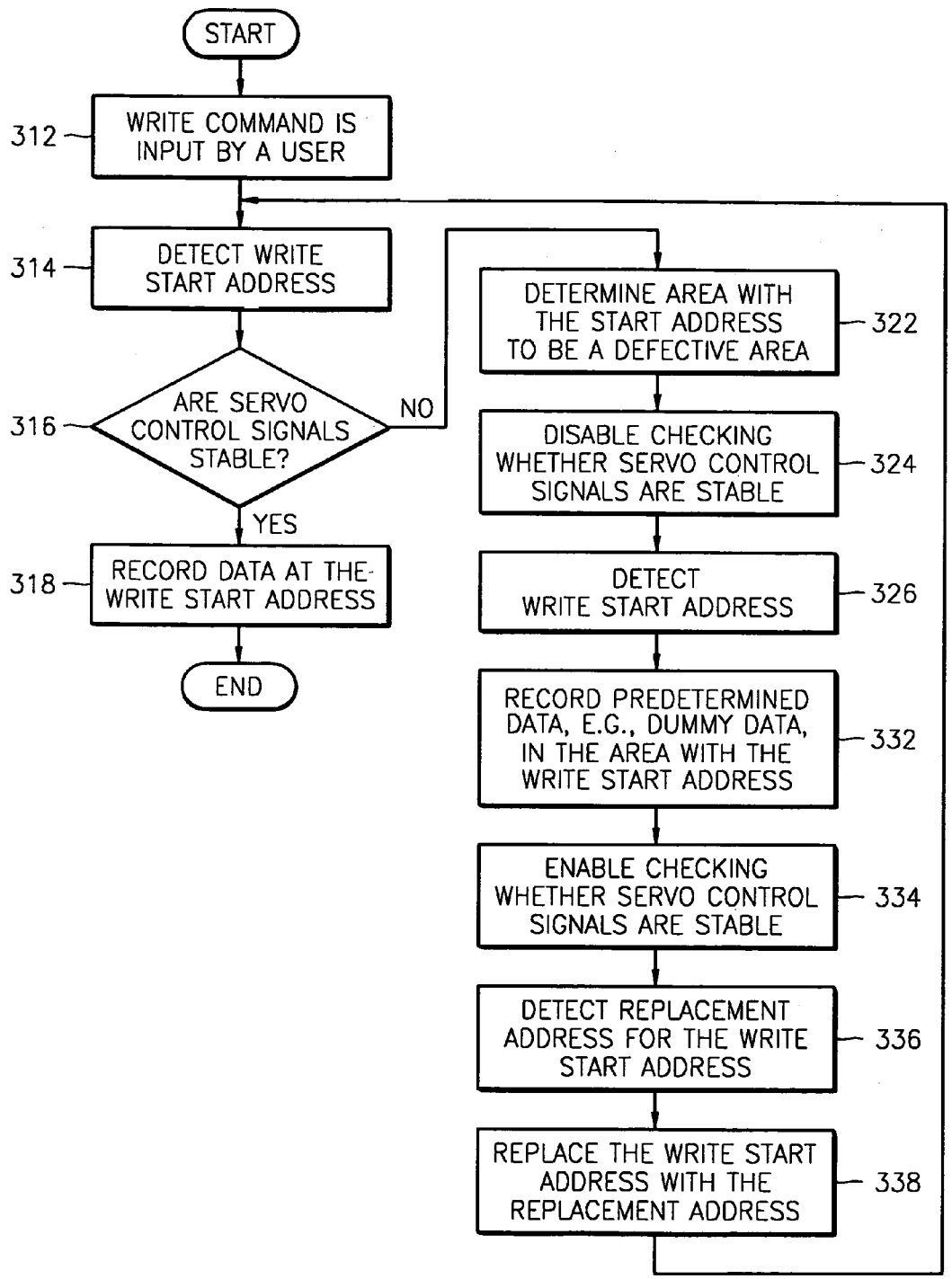

METHOD OF AND APPARATUS FOR RECORDING DATA ON DEFECTIVE OPTICAL STORAGE MEDIA AND COMPUTER READABLE MEDIUM STORING THE METHOD

CROSS-REFERENCE TO RELATED APPLICATIONS

This application claims the priority of Korean Patent Application No. 2002-74129 filed Nov. 26, 2002 in the Korean Intellectual Property Office, the disclosure of which is incorporated herein in its entirety by reference.

BACKGROUND OF THE INVENTION

1. Field of the Invention

The present invention relates to an optical recording system for managing defects in optical storage media, and more particularly, to a method and apparatus for compulsorily recording data in a defective area of an optical disc, thereby enabling optical disc compatibility with various disc driving apparatuses.

2. Description of the Related Art

Increasingly, information storage media, such as compact discs (CDs) and rewritable CDs (CD-RW), on which high-pitched digital audio data can be recorded, are being used.

In response to this increase, optical disc driving apparatuses such as CD-RW drives have been developed to reproduce data written to a CD or to write an external signal to a CD-RW. With CD-RW drives, a user can selectively record his/her favorite audio music or programs to a CD-RW.

An optical disc drive capable of driving CD-RWs, operates in response to data and instructions from a host and writes the data to a CD-RW using Eight-to-Fourteen Modulation (EFM). Also, wobble signals containing time information and recording laser power setting information are recorded on the CD-RW. Therefore, a CD-RW drive is required to record data on the CD-RW in synchronization with the wobble signals recorded on the CD-RW.

A method of recording data using such a conventional optical disc driving apparatus capable of driving a CD-RW will now briefly described.

First, a write start address is detected to record data on a CD-RW. Then, when stable servo control signals are generated during the detection of the write start address, the data is recorded at the detected write start address of the CD-RW. However, if the write start address is not detected or the servo control signals are unstable, the recording area is regarded as having a defect and a replacement address is determined. Thereafter, the data is recorded at the replacement address.

The conventional optical disc driving apparatus can perform a stable recording operation when data is recorded at a desired address of a CD-RW at least once. This is possible because signals necessary for servo controls are recorded on the CD-RW. However, it is difficult to read data from a CD-RW having an area with a defect, using different types of optical disc driving apparatuses other than the CD-RW drive.

If it is assumed that a CD-RW has addresses n–a through n–1 where recording is complete, addresses n through n+a where recording is unsuccessfully performed, and addresses n+a+1, . . . , where recording is complete, as shown in FIG. 1, then to reproduce data from the CD-RW, an optical disc driving apparatus detects preceding addresses to read data from the addresses n+a+1, . . . . In this case, since a DVD-ROM drive and a CD-ROM drive cannot read wobble signals recorded on the CD-RW, they cannot detect an area from the addresses n through n+a and further cannot read data recorded at the address n+a+1.

SUMMARY OF THE INVENTION

The present invention provides a method of compulsorily recording data in a defective area of an optical storage medium such as, for example, an optical disc, thereby enabling disc compatibility with various disc driving apparatuses.

The present invention also provides an apparatus for recording data on a disc using such a method and a computer readable storage medium encoded with processing instructions for performing such a method.

Additional aspects and advantages of the invention will be set forth in part in the description which follows and, in part, will be obvious from the description, or may be learned by practice of the invention.

According to an aspect of the present invention, there is provided a method of recording data in a defective area of an optical storage medium. The method includes: detecting a write start address in response to a write command; checking whether a specific area at the write start address has a defect when the write start address is not detected due to unstable servo control signals during the detection of the write start address; continuing to detect the write start address while disabling a register which checks whether the servo control signals are stable when the specific area is determined to be a defective area; recording previously-generated data in the specific area and enabling checking whether the servo control signals are stable, when the write start address is detected; and determining a replacement address for the write start address while the register which checks whether the servo control signals are stable is enabled, and recording data at the replacement address.

According to another aspect of the present invention, there is provided an apparatus for recording data in a defective area of a CD-RW. The apparatus includes: a pickup that records data on the CD-RW; a record signal processor that converts an external signal into recordable data and sends the recordable data to the pickup; a servo that controls servo operations for recording the data processed by the record signal processor on the CD-RW; and a controller that disables a register that checks whether the servo operations of the servo are stable when an unavailable area is detected during detection of a write start address, detecting the write start address and generating dummy data while disabling the register, enabling the register, and recording data at a replacement address that is a substitute for the write start address.

According to yet another aspect of the present invention, there is provided a computer readable storage medium encoded with processing instructions for performing a method of recording data in a defective area of an optical storage medium. The method includes: detecting a write start address in response to a write command; checking, when the write start address is not detected due to unstable servo control signals during the detection of the write start address, whether a specific area at the write start address is a defective area; continuing to detect the write start address while disabling checking whether the servo control signals are stable when the specific area is determined to be a defective area; recording previously-generated data in the specific area when the write start address is detected and enabling checking whether the servo control signals are stable; determining a replacement address for the write start address while checking whether the servo control signals are stable is enabled; and recording data at the replacement address.

According to still another aspect of the present invention, there is provided a controller for use in an apparatus for recording data in a defective area of a CD-RW. The controller includes: a write start address detector that detects a write start address; a register enabler/disabler that disables and enables a register that checks whether servo operations are stable or unstable; a data generator that generates generated data while the register is disabled; the generated data being sent to a pickup to be recorded at the write start address; a replacement write start address determiner that determines a replacement write start address that is a substitute for the write start address and replaces the write start address with the replacement write start address; and a data recording initiator that causes data to be sent to the pickup to be recorded at the replacement write start address. The register enabler/disabler disables the register when a defect is detected at the write start address and enables the register after the generated data is recorded at the replacement write start address.

According to yet another aspect of the present invention, there is provided a method of recording data in a defective area of an optical storage medium. The method includes: detecting a write start address; checking, via a register, whether an area at the write start address has a defect; disabling the register while continuing to detect the write start address when it is determined that an area in the write start address has a defect; recording previously-generated data at the write start address; enabling the register after the previously-generated data is recorded; determining a replacement write start address after the previously-generated data is recorded; recording data the replacement address.

According to still another aspect of the present invention, there is provided an optical disc including: a substrate having a plurality of areas identified by onto which data is recordable; first data record recorded at an area identified by a write start address upon determining that an area of the write start address has a defect; and second data recorded at one of an area identified by a write start address upon determining that an area of the write start address does not have a defect and an area identified by a replacement write start address upon recording the first data. Further, the first data is previously-generated dummy data.

BRIEF DESCRIPTION OF THE DRAWINGS

These and/or other aspects and advantages of the invention will become apparent and more readily appreciated from the following description of the preferred embodiments taken in conjunction with the accompanying drawings in which:

FIG. 3 is a block diagram illustrating a method of recording data on a defective disc, according to an embodiment of the present invention.

DETAILED DESCRIPTION OF THE PREFERRED EMBODIMENTS

Figure 1:
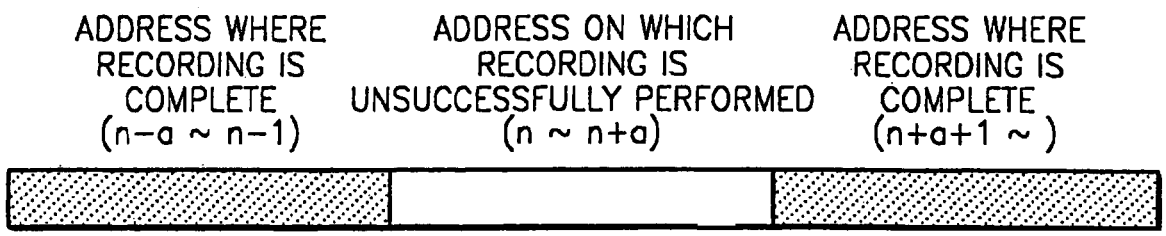
FIG. 1 illustrates the structure of a disc on which recording is performed using a conventional data recording method.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Hereinafter, preferred embodiments of the present invention will be described with reference to the accompanying drawings.

Figure 2:
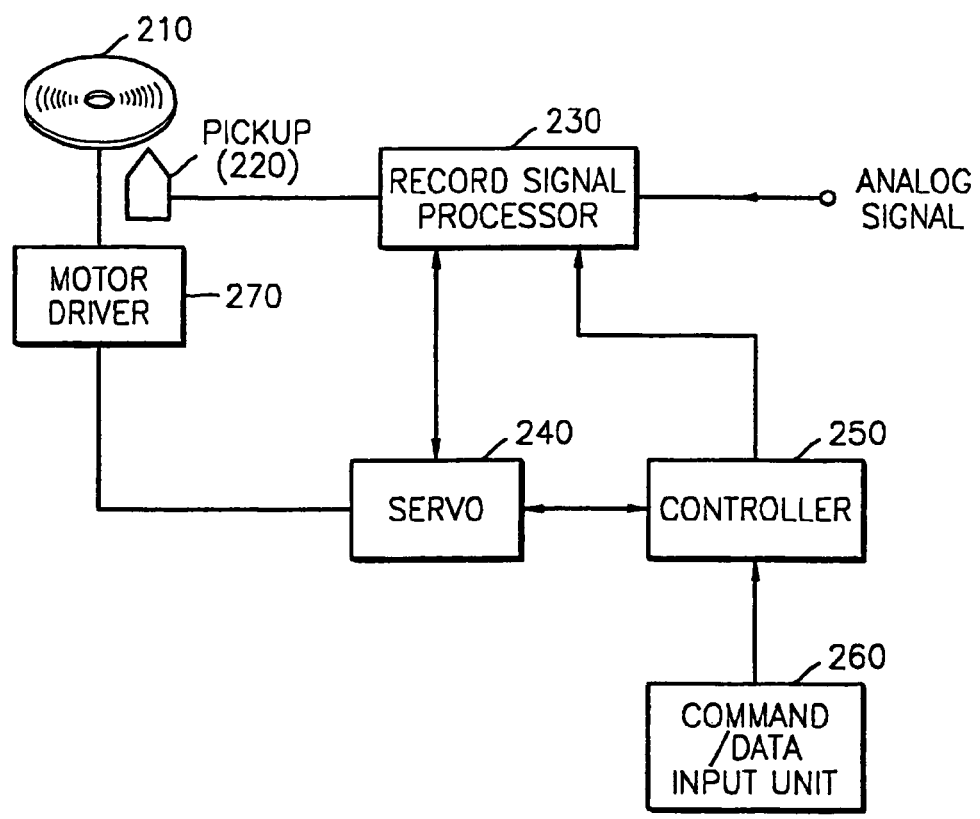
FIG. 2 is a block diagram illustrating the structure of a recording apparatus capable of recording data on a defective disc, according to an embodiment of the present invention.

FIG. 2 is a block diagram illustrating the structure of an apparatus for recording data on a defective disc according to an embodiment of the present invention. Referring to FIG. 2, a pickup 220 reads data from a CD-RW 210, on which data can be rewritten, or writes data input from a record signal processor 230 to the CD-RW 210. The record signal processor 230 converts an analog signal input from the outside into recordable data. A servo 240 controls servo operations for recording data on the CD-RW 210, upon receiving the data processed by the record signal processor 230 and a control signal generated by a controller 250. A motor driver 270 drives a spindle motor (not shown) in response to the servo control signal generated by the servo 240.

The controller 250 controls the operations of the record signal processor 230 and the servo 240, in response to a write command and data input from a command/data input unit 260. In particular, the controller 250 disables a register (not shown), which checks whether the servo control signal is stable, when a defect is detected in the CD-RW (i.e., when recording cannot be performed due to an unstable wobble servo operation during detection of a write start address pursuant to the write command). Next, the controller 250 detects the write start address while disabling the register and forces dummy data to be recorded, starting from the detected write start address. Thereafter, the controller 250 enables the register, determines a replacement write start address, and records or causes to be recorded data at a replacement address for the write start address. The aforementioned process may be repeated if the replacement address is also determined to be in a defective area.

The command/data input unit 260 receives data and instructions from a host (not shown) and sends them to the controller 250.

FIG. 3 is a block diagram illustrating a method of recording data on a defective disc, according to a preferred embodiment of the present invention. Referring to FIG. 3, first, a register is set to determine whether servo control signals are stable or not.

Next, in action 312, a write command is input by a user. In action 314, a write start address is detected.

In action 316, it is checked whether the servo control signals are stable or not during the detection of the write start address. If it is determined in action 316 that the servo control signals are stable, data is recorded at the detected write start address, in action 318.

However, if it is determined in action 316 that the servo control signals are unstable, i.e., the write start address is not detected due to the unstable servo control signals, the area with the write start address is regarded as being a defective area, in action 322. Here, several criteria can be used to determine whether the servo control signals are stable or unstable. For instance, when a level of a focus servo signal does not fall within a predetermined range during recording data to the CD-RW, the servo signal can be determined to be unstable. Also, a servo control signal may be determined to be unstable when a wobble synchronization signal providing absolute time in pregroove (ATIP) information is not detected at a desired position due to an unstable wobble signal before recording data. Still further, the servo control signal may be determined to be unstable when the amount of changes in the ATIP information does not fall within a predetermined range.

In action 324, checking whether the servo control signals are stable is disabled when a defect is detected on the CD-RW. In action 326, the write start address is detected while the register that checks whether the servo control signals are stable or unstable is disabled. In action 332, predetermined data, e.g., dummy data, is recorded at the write start address when the write start address is detected. In action 334, checking whether the servo control signals are stable or unstable is enabled after the recording of the predetermined data. In action 336, a replacement address, which is a substitute for the write start address, is determined while the register that checks whether the servo control signals are stable is enabled. In action 338, the write start address is replaced with the replacement address and desired data is recorded at the replacement address.

As described above, according to the present invention, dummy data is recorded in a defective area of a CD-RW, thereby enabling disc compatibility with various disc driving apparatuses.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of recording data in a defective area of an optical storage medium, the method comprising:
    detecting a write start address in response to a write command;
    checking, when the write start address is not detected due to unstable servo control signals during the detection of the write start address, whether a specific area at the write start address is a defective area;
    continuing to detect the write start address while disabling a register which checks whether the servo control signals are stable when the specific area is determined to be the defective area;
    recording previously-generated data in the specific area when the write start address is detected and enabling the register which checks whether the servo control signals are stable;
    determining a replacement address for the write start address while the register which checks whether the servo control signals are stable is enabled; and
    recording data at the replacement address.

2. The method of claim 1, further comprising recording data in the specific area when the write start address is detected with stable generation of the servo control signals.

3. The method of claim 1, wherein whether the servo control signals are stable or unstable is determined by one of comparing the level of a focus servo control signal with a reference level, determining whether a wobble synchronization signal providing absolute time in pregroove (ATIP) information is not detected at a desired position due to an unstable wobble signal before recording data, and determining whether the amount of changes in the ATIP information does not fall within a predetermined range.

4. The method of claim 1, wherein the previously-generated data is dummy data.

5. The method of claim 1, wherein the optical storage medium is a CD-RW to which data is repeatedly rewritable.

6. An apparatus for recording data in a defective area of a CD-RW, comprising:
    a pickup that records data on the CD-RW;
    a record signal processor that converts an external signal into recordable data and sends the recordable data to the pickup;
    a servo that controls servo operations for recording the data processed by the record signal processor on the CD-RW; and
    a controller that disables a register which checks whether the servo operations are stable when an unavailable area is detected during detection of a write start address, detects the write start address, generates data while the register is disabled and causes the pickup to record the generated data at the write start address, enables the register, and causes the pickup to record the data at a replacement address that is a substitute for the write start address.

7. The apparatus of claim 6, wherein the controller causes the pickup to record the data at the write start address when the write start address is detected and a servo operation is stable.

8. The apparatus of claim 6, wherein the stability of the servo is determined by comparing the level of a focus servo control signal with a reference level.

9. The apparatus of claim 6, wherein the generated data is dummy data.

10. A computer readable storage medium encoded with processing instructions for performing a method of recording data in a defective area of an optical storage medium, the method comprising:
    detecting a write start address in response to a write command;
    checking, when the write start address is not detected due to unstable servo control signals during the detection of the write start address, whether a specific area at the write start address is a defective area;
    continuing to detect the write start address while disabling a register which checks whether the servo control signals are stable when the specific area is determined to be a defective area;
    recording previously-generated data in the specific area when the write start address is detected and enabling checking whether the servo control signals are stable;
    determining a replacement address for the write start address while enabling the register which checks whether the servo control signals are stable; and
    recording data at the replacement address.

11. A controller for use in an apparatus having a pickup for recording data as in a defective area of a CD-RW, the controller comprising:
    a write start address detector that detects a write start address;
    a register enabler/disabler that disables and enables a register which checks whether servo operations are stable or unstable;
    a data generator that generates generated data while the register is disabled, the generated data being sent to the pickup to be recorded at the write start address;
    a replacement write start address determiner that determines a replacement write start address that is a substitute for the write start address and replaces the write start address with the replacement write start address; and a data recording initiator that causes data to be sent to the pickup to be recorded at the replacement write start address after a replacement write start address is determined, wherein the register enabler/disabler disables the register when a defect is detected at the write start address and enables the register after the generated data is recorded at the replacement write start address.

12. The controller of claim 11, wherein a defect is detected at the write start address when an unstable servo control signal is generated when the write start address detector detects the write start address.

13. A method of recording data in a defective area of an optical storage medium, the method comprising:

detecting a write start address;

checking, via a register, whether an area at the write start address has a defect;

disabling the register while continuing to detect the write start address upon determining that an area of the write start address has a defect;

recording previously-generated data at the write start address;

enabling the register after the previously-generated data is recorded;

determining a replacement write start address after the previously-generated data is recorded;

recording data the replacement address.

14. The method of claim 13, wherein the checking comprises checking the stability of servo control signals and an area is determined to be defective when the write start address is not detected due to unstable servo control signals generated during the detecting of the work sheet address.

15. The method of claim 13, wherein the previously-generated data is dummy data.

* * * * *